US012326027B2

(12) United States Patent
Jidaisho

(10) Patent No.: US 12,326,027 B2
(45) Date of Patent: Jun. 10, 2025

(54) VEHICLE DOOR PUSHING DEVICE

(71) Applicant: AISIN CORPORATION, Kariya (JP)

(72) Inventor: Kiyotaka Jidaisho, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/596,864

(22) Filed: Mar. 6, 2024

(65) Prior Publication Data

US 2024/0309693 A1 Sep. 19, 2024

(30) Foreign Application Priority Data

Mar. 16, 2023 (JP) ................................ 2023-041814

(51) Int. Cl.
*E05F 15/622* (2015.01)

(52) U.S. Cl.
CPC ....... *E05F 15/622* (2015.01); *E05Y 2201/426* (2013.01)

(58) Field of Classification Search
CPC ....... E05F 15/622; E05F 15/60; E05F 15/616; E05F 15/611; E05Y 2201/426; E05B 81/20; E05B 81/06
See application file for complete search history.

(56) References Cited

U.S. PATENT DOCUMENTS 6,338,536 B1 * 1/2002 Ueno ...................... E05F 15/60 49/478.1
6,711,856 B1 * 3/2004 Hoffman ................. E05F 1/105 49/386
9,174,517 B2 * 11/2015 Scheuring ................ B60J 5/047
10,633,893 B2 * 4/2020 Harajli ..................... E05B 81/20
10,711,503 B2 * 7/2020 Linden ................... B60R 13/043
10,934,748 B2 * 3/2021 Harajli ..................... E05B 81/20
11,008,797 B2 * 5/2021 Termine ................ E05F 15/622
11,220,853 B2 * 1/2022 Cumbo ................... E05F 15/41
11,499,350 B2 * 11/2022 Rrumbullaku ............. B60J 5/04
11,566,463 B2 * 1/2023 Melendez Valdez ........................ E05F 15/622
11,697,952 B2 * 7/2023 Ottino ..................... E05F 1/105 49/139
2013/0111815 A1 * 5/2013 Allison ................... E05F 1/105 49/506
2018/0073287 A1 * 3/2018 Reddmann ............ E05F 15/627
2018/0179788 A1 * 6/2018 Oxley ..................... E05B 81/13
2019/0143796 A1 * 5/2019 Linden .................... E05F 15/00 49/386

(Continued)

*Primary Examiner* — Justin B Rephann
(74) *Attorney, Agent, or Firm* — Oblon, McClelland, Maier & Neustadt, L.L.P.

(57) ABSTRACT

A vehicle door pushing device in a vehicle door includes a gear member, a male screw member, and a female screw member. The gear member is rotatable by an actuator around an axis extending in a first direction substantially parallel to a vehicle width direction. The male screw member is coaxial with the gear member, and rotates integrally with the gear member. The female screw member is screwed onto the male screw member, and is movable along the first direction by rotation of the male screw member to each of a first position of being in a casing and a second position of at least partially protruding from the casing to a vehicle inner side. The gear member has a cup-shaped structure open at an end on the vehicle inner side in the first direction for being able to accommodate at least a part of the female screw member.

5 Claims, 6 Drawing Sheets

(56) References Cited

U.S. PATENT DOCUMENTS

| | | | | |
|---|---|---|---|---|
| 2019/0153768 | A1* | 5/2019 | Termine | E05F 15/622 |
| 2019/0203508 | A1* | 7/2019 | Harajli | E05F 15/60 |
| 2019/0292818 | A1* | 9/2019 | Cumbo | E05B 81/77 |
| 2020/0217107 | A1* | 7/2020 | Harajli | E05F 15/60 |
| 2020/0263456 | A1* | 8/2020 | Rrumbullaku | E05F 15/60 |
| 2020/0270928 | A1* | 8/2020 | Cumbo | E05F 15/611 |
| 2021/0254389 | A1* | 8/2021 | Termine | E05F 15/622 |
| 2021/0284003 | A1* | 9/2021 | Salter | B60J 5/0402 |
| 2021/0301561 | A1* | 9/2021 | Cumbo | E05B 81/14 |
| 2022/0025692 | A1* | 1/2022 | Henes | E05F 15/614 |
| 2022/0136308 | A1* | 5/2022 | Melendez Valdez | B60J 5/0493 49/276 |
| 2022/0186529 | A1* | 6/2022 | Cumbo | E05B 83/38 |
| 2023/0220717 | A1* | 7/2023 | Cetnar | E05B 81/20 49/70 |
| 2024/0301741 | A1* | 9/2024 | Wang | E05F 15/622 |

* cited by examiner

VEHICLE DOOR PUSHING DEVICE

CROSS REFERENCE TO RELATED APPLICATIONS

This application is based on and claims priority under 35 U.S.C. § 119 to Japanese Patent Application No. 2023-041814, filed on Mar. 16, 2023, the entire content of which is incorporated herein by reference.

TECHNICAL FIELD

This disclosure generally relates to a vehicle door pushing device.

BACKGROUND DISCUSSION

Conventionally, a vehicle door is provided with a door lock device configured in such a way as to be switchable between a latching state of holding the vehicle door in a closed state and an unlatching state of allowing the vehicle door to be opened. When the door lock device is switched from the latching state to the unlatching state while the door is in the closed state, the vehicle door is moved (pushed out) from a closing position to an opening position by elastic force of a weather seal interposed between the door and a vehicle body. However, for example, when the weather seal is frozen due to rainwater or the like on the weather seal, the vehicle door is not moved from the closing position to the opening position, in some cases.

US2022/0136308A1 (Reference 1) discloses a door pushing device that is arranged in a vehicle door and includes a rod configured in such a way as to be protruded from a casing by rotational power of a motor. The door pushing device disclosed in Reference 1 can move the vehicle door from a closing position to an opening position by reaction force generated by the rod pushing a vehicle body when the rod is protruded from the casing. According to such a door pushing device, even when the weather seal is frozen, the vehicle door can be moved from the closing position to the opening position.

Incidentally, a door body portion of a vehicle door is configured in such a way that a window glass can be accommodated in an upper portion of the door body portion. Thus, a door pushing device needs to be arranged in such a way as not to interfere with the window glass and a movement trajectory of the window glass. Accordingly, when the door pushing device is arranged at the upper portion of the door body portion, a size of the door pushing device in a door width direction is required to be reduced in such a way that the door pushing device can be arranged between a door panel constituting the door body portion and the window glass (and the movement trajectory thereof) accommodated in the door body portion.

A need thus exists for a vehicle door pushing device, which is not susceptible to the drawback mentioned above.

SUMMARY

A vehicle door pushing device according to an aspect of this disclosure is arranged in a vehicle door that can be opened and closed with respect to a vehicle body. The vehicle door pushing device includes a gear member, a male screw member, and a female screw member. The gear member is rotatable, by rotational power being output by an actuator, around an axis extending in a first direction substantially parallel to a vehicle width direction in a state where the vehicle door is in a closed state. The male screw member is arranged coaxially with the gear member, and rotates integrally with the gear member. The female screw member is screwed onto the male screw member. The female screw member is movable, along the first direction by rotation of the male screw member, to each of a first position of being accommodated in a casing and a second position of being located on a vehicle inner side of the first position and at least partially protruding from the casing to the vehicle inner side. The gear member has a cup-shaped structure being open at an end on the vehicle inner side in the first direction in such a way as to be able to accommodate at least a part of the female screw member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of this disclosure is described with reference to the drawings. In the following description, directions of a vehicle door pushing device and each member of the vehicle door pushing device are based on each direction of a vehicle door. In each of the drawings, a front side of the vehicle door is indicated by the arrow Fr, a rear side of the vehicle door is indicated by the arrow Rr, an upper side of the vehicle door is indicated by the arrow Up, a lower side of the vehicle door is indicated by the arrow Dw, a vehicle outer side in a width direction (a left-right direction or a thickness direction) of the vehicle door is indicated by the arrow Out, and a vehicle inner side in the width direction of the vehicle door is indicated by the arrow In. Hereinafter, the width direction of the vehicle door is referred to as "door width direction" in some cases. The door width direction is "a vehicle width direction when the vehicle door is in a closed state". A direction substantially parallel to the door width direction is an example of a first direction in this disclosure. In the following description, the vehicle door pushing device is simply referred to as "door pushing device" in some cases.

(Vehicle Door)

Figure 1A:
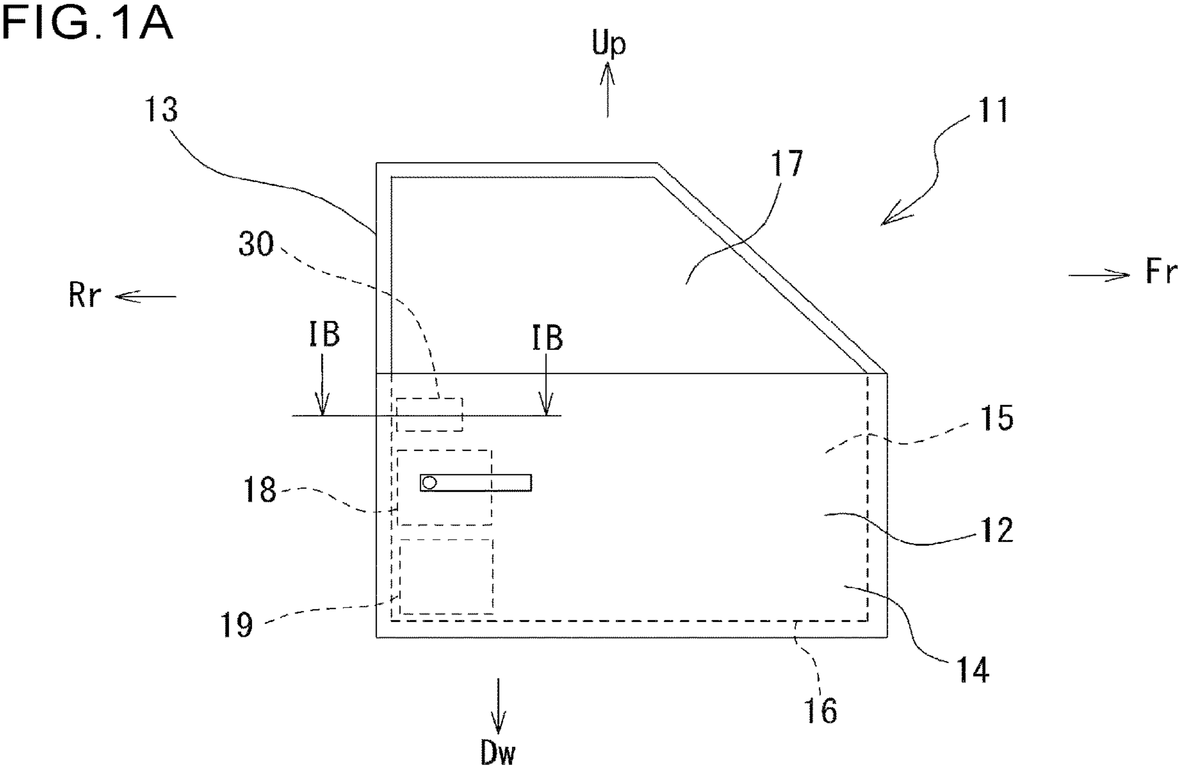
FIG. 1A is a schematic diagram illustrating a configuration of a vehicle door.
Figure 1B:
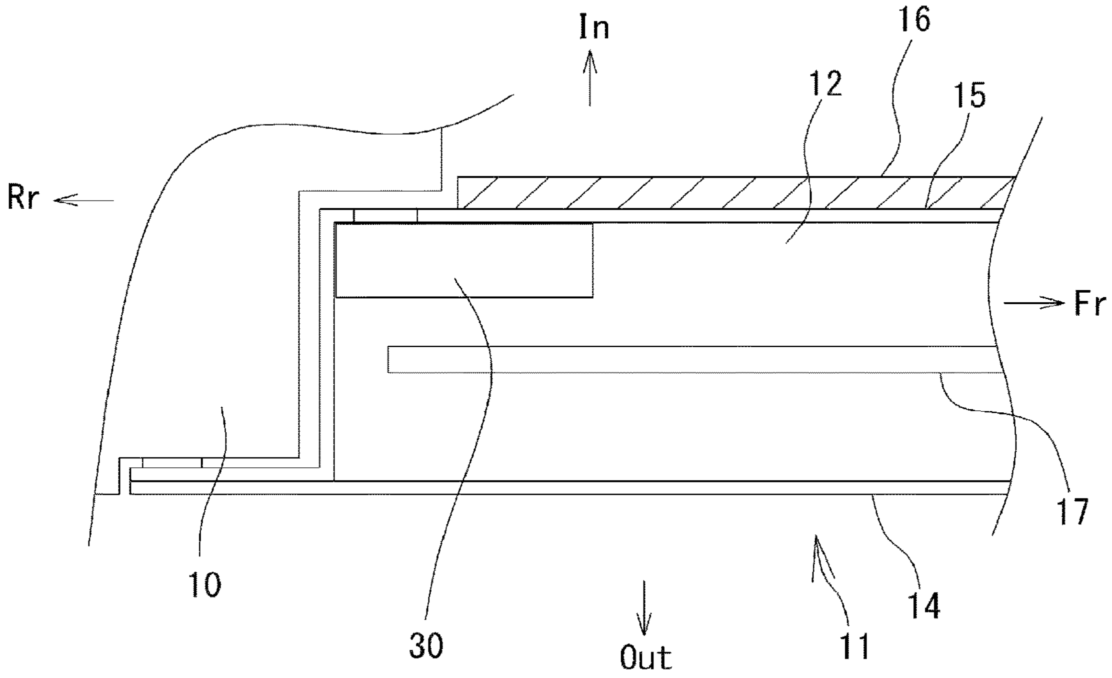
FIG. 1B is a schematic diagram illustrating the configuration of the vehicle door.

FIG. 1A is a side view of the vehicle door 11 including the door pushing device 30, and is an illustration viewed from a vehicle outer side. FIG. 1B is a sectional view of the vicinity of a rear end portion of the vehicle door 11 including the door pushing device 30, and is a sectional view taken along the line IB-IB in FIG. 1A.

The vehicle door 11 is attached to a vehicle body 10 in such a way as to be openable and closable. Specifically, a front end portion of the vehicle door 11 is coupled to the vehicle body 10 in such a way that the vehicle door 11 is rotatable relative to the vehicle body 10. The vehicle body 10 is rotated (swung in a pendulum manner) around the front end portion, relative to the vehicle body 10, and can be thereby moved to each of a closing position and an opening position. The closing position is a position where the vehicle door 11 closes an getting-on-and-off opening provided in the vehicle body 10, and the opening position is a position where the vehicle door 11 does not close the opening.

The vehicle door 11 includes a door body portion 12 constituting a lower half of the vehicle door 11, and a door sash 13 provided at an upper half of the vehicle door 11. The door body portion 12 includes an outer panel 14, an inner panel 15, and a trim 16. The door body portion 12 is configured in such a way as to be able to accommodate a window glass 17 in an inner portion (an area surrounded by the inner panel 15 and the outer panel 14) of the door body portion 12. The outer panel 14 forms a vehicle outer side surface of the vehicle door 11. The inner panel 15 is located on a vehicle inner side of the outer panel 14, and is fixed to the outer panel 14. The trim 16 is fixed on a vehicle inner side of the inner panel 15, and forms a vehicle inner side surface of the door body portion 12.

A door lock device 18 and a door closer device 19 as well as the door pushing device 30 are arranged in the door body portion 12 of the vehicle door 11. The door lock device 18 is a device configured in such a way as to be switchable to each of a full-latching state, a half-latching state, and an unlatching state. The full-latching state is a state (i.e., the state of restricting movement of the vehicle door 11 in such a way as to prevent the vehicle door 11 from moving from the closing position to the opening position) of holding the vehicle door 11 in the closing state when the vehicle door 11 is located at a fully closing position (that is a position included in the closing position and is the position at one end of a movable range of the vehicle door 11). The half-latching state is a state of holding the vehicle door 11 in the closed state when the vehicle door 11 is located at a half-closing position (a position included in the closing position and slightly shifted toward the opening position from the fully closing position). The unlatching state is a state of allowing the vehicle door 11 to be opened (moved from the closing position to the opening position).

The door closer device 19 is coupled to the door lock device 18 by a coupling member such as a wire or a rod. The door closer device 19 is configured in such a way as to switch the door lock device 18 from the half-latching state to the full-latching state by pulling the coupling member by drive force of an actuator 35. The door lock device 18 is arranged near a rear end portion inside the door body portion 12 of the vehicle door 11. The door closer device 19 is arranged on a lower side of the door lock device 18 and near the rear end portion inside the door body portion 12 of the vehicle door 11.

(Door Pushing Device)

As illustrated in FIG. 1A, the door pushing device 30 is arranged near the rear end portion and near an upper end portion inside the door body portion 12. As illustrated in FIG. 1B, the door pushing device 30 is arranged inside the door body portion 12 and between a movement trajectory of the window glass 17 and the inner panel 15. The window glass 17 moves in a direction substantially perpendicular to the paper sheet surface of FIG. 1B.

Figure 2:
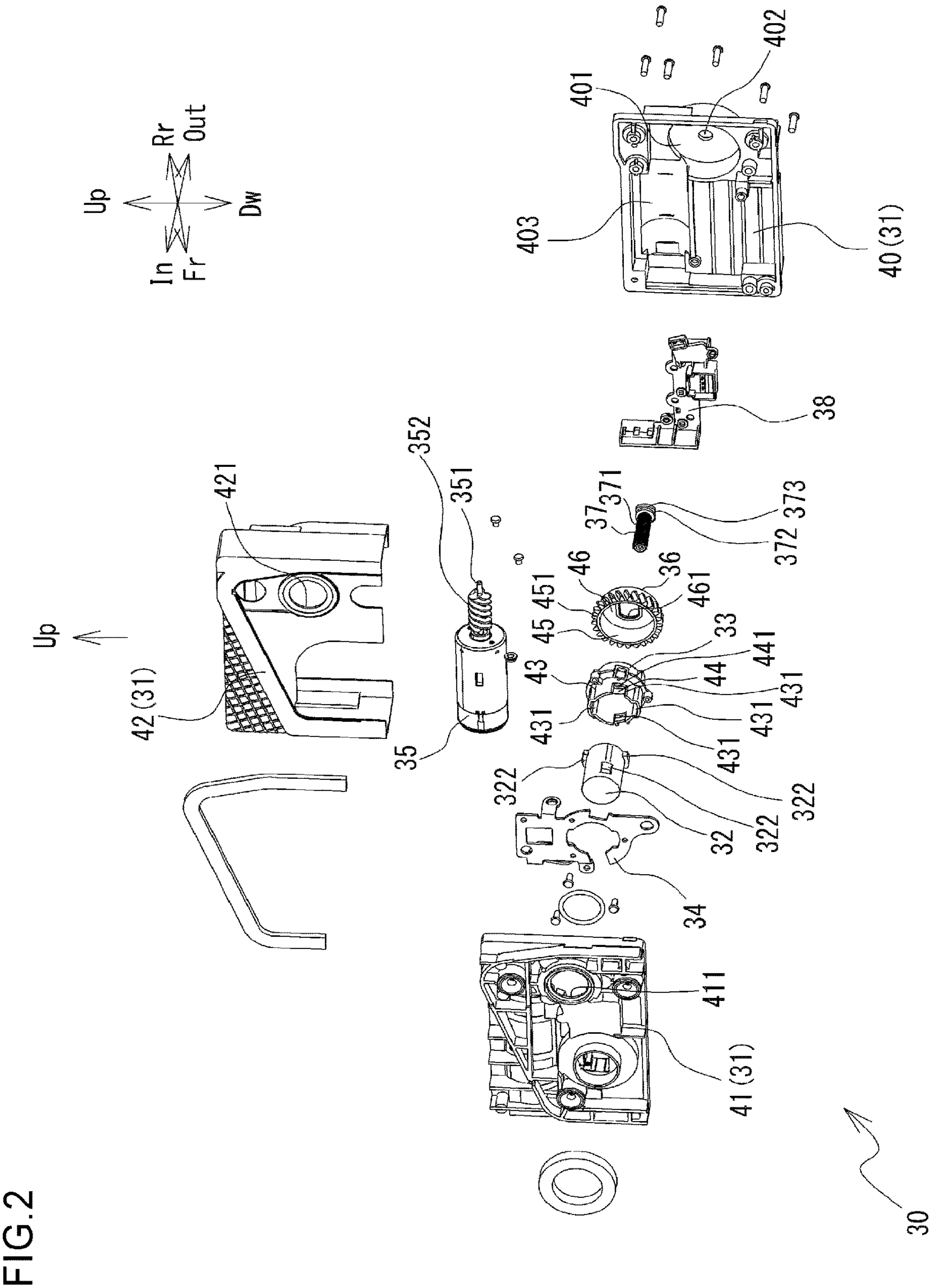
FIG. 2 is an exploded perspective view illustrating a configuration of a vehicle door pushing device.
Figure 3:
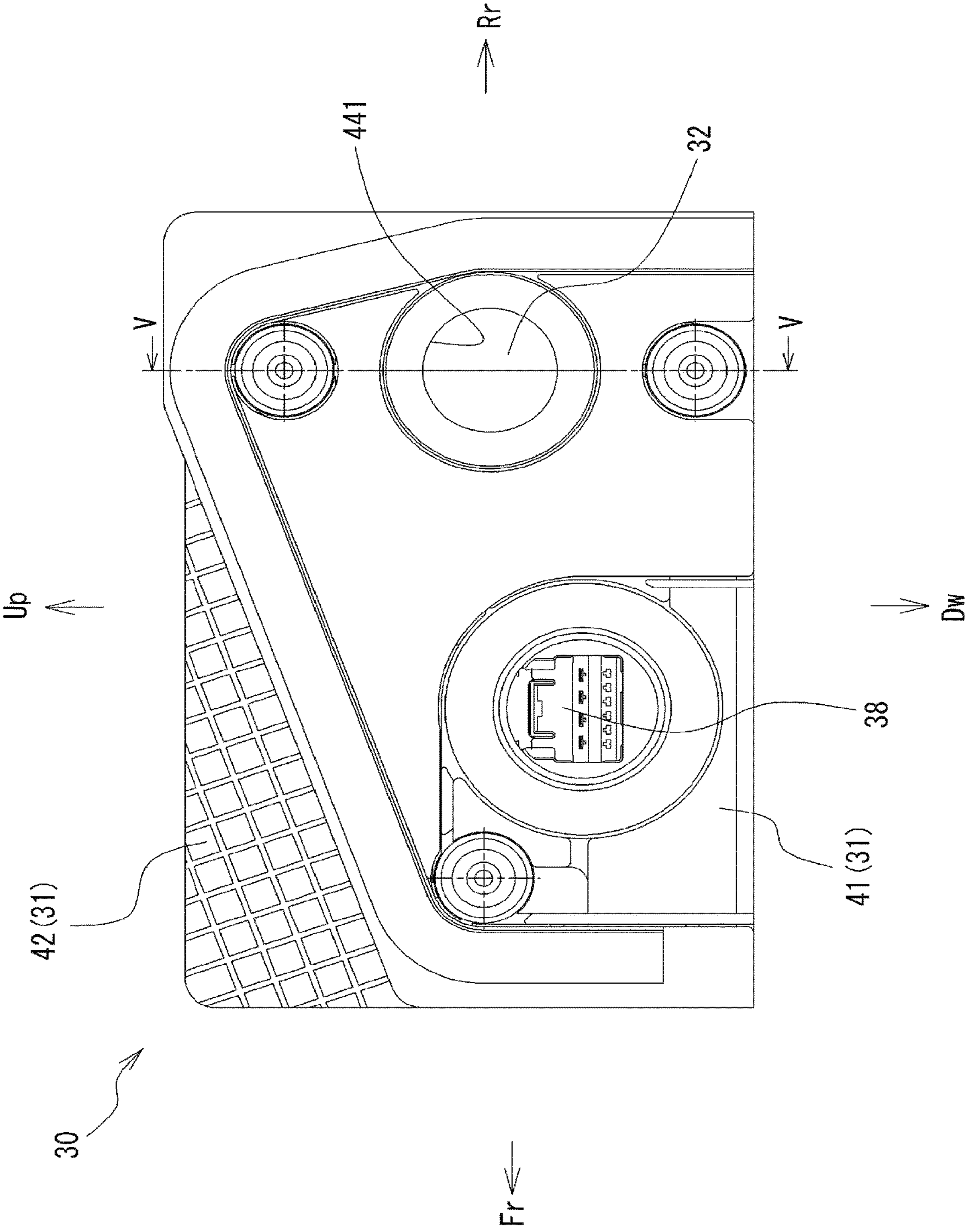
FIG. 3 is a side view illustrating the configuration of the vehicle door pushing device.

FIG. 2 is an exploded perspective view of the door pushing device 30, and FIG. 3 is a side view of the door pushing device 30 viewed from a vehicle inner side in the door width direction. As illustrated in FIG. 2 and FIG. 3, the door pushing device 30 includes a casing 31, a pressing nut 32, a guide member 33, a frame 34, an actuator 35, a wheel gear 36, a spindle screw 37, a circuit board 38.

The casing 31 includes a housing 40, a cover 41, and a waterproof cover 42. The housing 40 is a member having a structure of a tray shape (that can be rephrased as a box shape having a shallow bottom) open on a vehicle inner side in the door width direction. The housing 40 is provided with a wheel gear accommodation portion 401, a spindle screw support portion 402, and an actuator accommodation portion 403. The wheel gear accommodation portion 401 is a part where a bottomed recess portion is provided in such a way as to have a substantially circular shape in a view in the door width direction and be open to a vehicle inner side in the door width direction. The wheel gear accommodation portion 401 is configured in such a way as to be able to accommodate the below-described vehicle-outer-side end portion of the wheel gear 36 in the door width direction and a part in the wheel gear 36 and near the vehicle-outer-side end portion. The spindle screw support portion 402 is provided on a surface (a surface corresponding to a bottom surface of the recess portion) that is included in the wheel gear accommodation portion 401 and that faces to a vehicle inner side. The spindle screw support portion 402 is a part where a bottomed recess portion is provided in such a way as to have a substantially circular shape in a view in the door width direction and be open to a vehicle inner side in the door width direction. The spindle screw support portion 402 is configured in such a way as to rotatably support the below-described supported shaft portion 374 of the spindle screw 37 (i.e., configured in such a way that the supported shaft portion 374 can be inserted into the spindle screw support portion 402). The actuator accommodation portion 403 is a part where a bottomed recess portion is provided in such a way as to be open to a vehicle inner side in the door width direction. The actuator accommodation portion 403 is configured in such a way as to be able to accommodate the actuator 35.

The cover 41 is a member attached on a vehicle inner side of the housing 40 in the door width direction. The cover 41 is a bottomed member having a structure of a tray-shape (that can be rephrased as a box shape having a shallow bottom) open on a vehicle outer side in the door width direction. The cover 41 includes a pressing-nut insertion hole 411. The pressing-nut insertion hole 411 is a penetration hole penetrating in the door width direction, and is formed in such a way as to allow the pressing nut 32 to be inserted therethrough. The waterproof cover 42 is a member configured in such a way as to cover at least upper surfaces, front surfaces, and rear surfaces (i.e., surfaces that include surfaces where joint locations between the housing 40 and the cover 41 exist and that exclude lower surfaces) of the housing 40 and the cover 41. The waterproof cover 42 includes a pressing-nut insertion hole 421, similarly to the cover 41.

Figure 4:
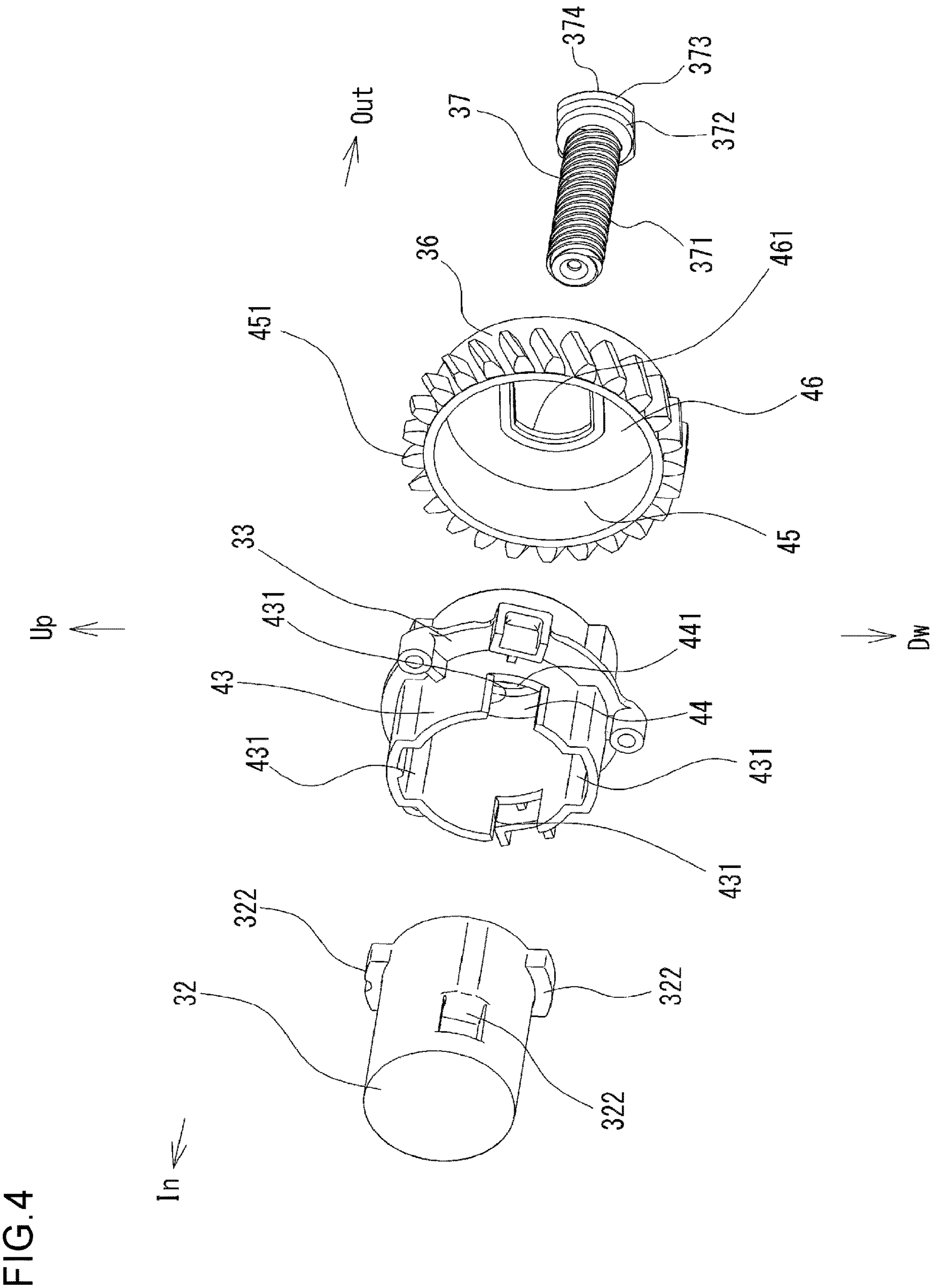
FIG. 4 is an enlarged view of s pressing nut, a guide member, a wheel gear, and a spindle screw.

FIG. 4 is an enlarged view of the pressing nut 32, the guide member 33, the wheel gear 36, and the spindle screw 37. The pressing nut 32 is an example of a female screw member in this disclosure. The pressing nut 32 is a member having a cap nut shape, and is configured in such a way as to be able to be screwed into the below-described spindle screw 37. Specifically, the pressing nut 32 has a bottomed cylindrical shape (that can be rephrased as a cup shape) including a bottomed screw hole 321 whose one end is open in the axial direction. A guide protrusion portion 322 is provided on a side surface (outer peripheral surface) of the pressing nut 32. The guide protrusion portion 322 is a part having a structure of a protrusion shape protruding outward in the radial direction, and is configured in such a way as to be able to engage with (be fitted into) the below-described guide groove portion 431 provided in the guide member 33.

The guide member 33 is a member that guides (which can be rephrased as "supports") the pressing nut 32 in such a way as to allow the pressing nut 32 to linearly reciprocate relative to the casing 31 in the door width direction, but prevent the pressing nut 32 from rotating relative to the casing 31 (specifically, prevent the pressing nut 32 from rotating around an axis parallel to the door width direction). The guide member 33 has a structure of a cup shape (which can be rephrased as a bottomed cylindrical structure) whose one end in the axial direction is open. Specifically, the guide member 33 includes a guide tube portion 43 and a guide end plate portion 44. The guide tube portion 43 is a substantially cylindrical part that forms a space inside. The guide end plate portion 44 is a plate-shaped part that is provided at one end portion of the guide tube portion 43 and that extends in a direction perpendicular to the axial direction. The guide tube portion 43 is configured in such a way that, from an end portion (an end portion opposite to the guide end plate portion 44) on an opening side in the guide tube portion 43, the pressing nut 32 can be accommodated into, inserted into, and removed from the guide tube portion 43. A part (a vehicle-outer-side end in the door width direction and a part near the vehicle-outer-side end) included in the guide member 33 and on a vehicle outer side in the door width direction is configured in such a way as to be insertable (i.e., loosely insertable) into the below-described wheel gear 36.

The guide groove portion 431 is provided on an inner peripheral surface of the guide tube portion 43. The guide groove portion 431 is a part having a groove-shaped structure extending in the axial direction of the guide tube portion 43, and is configured in such a way that the guide protrusion portion 322 of the pressing nut 32 can engage with (can enter) the guide groove portion 431. The engagement between the guide protrusion portion 322 of the pressing nut 32 and the guide groove portion 431 guides the pressing nut 32 in such a way as to be reciprocable linearly in the axial direction relative to the guide member 33, but to be prevented from rotating around the axis of the tube portion relative to the guide member 33.

A spindle screw insertion hole 441 is provided in the guide end plate portion 44. The spindle screw insertion hole 441 is a penetration hole penetrating in the axial direction, having a substantially circular cross section, and coaxial with the guide end plate portion 44, and is configured in such a way as to allow the below-described guide insertion portion 372 of the spindle screw 37 to be inserted (which can be rephrased as "loosely inserted") therethrough. The spindle screw insertion hole 441 is configured in such a way as to allow the spindle screw 37 to rotate relative to the guide member 33 in a state where the guide insertion portion 372 of the spindle screw 37 is inserted through the spindle screw insertion hole 441.

The frame 34 is a member that has a function of fixing the guide member 33 to the casing 31. The frame 34 is constituted by a metal plate, for example. The frame 34 is configured in such a way as to allow the guide member 33 to be screwed to the frame 34, and is configured in such a way as to be screwed to the casing 31.

The actuator 35 is a drive power source for reciprocating the pressing nut 32. An electric motor that can output rotational power in both of forward and reverse directions is applied as the actuator 35. A worm 352 is attached to a rotational shaft 351 of the electric motor. The electric motor that is the actuator 35 has a columnar shape in which an axial-direction dimension of the rotational shaft 351 is larger than a radial-direction dimension of the rotational shaft 351.

The wheel gear 36 is an example of a gear member in this disclosure. The wheel gear 36 is a member that transmits, to the spindle screw 37, the rotational power output from the actuator 35. The wheel gear 36 has a structure of a bottomed cup shape that is open on one end side in the axial direction. The wheel gear 36 may have a structure of a bottomed cylindrical shape that is open on one end side in the axial direction. Specifically, the wheel gear 36 includes a gear tube portion 45 and a gear end plate portion 46. The gear tube portion 45 is a part having a substantially cylindrical structure that forms a space inside. The gear end plate portion 46 is a part corresponding to the "a bottom of the cup", and is a part having a structure of a plate shape that is provided at one end portion of the gear tube portion 45 in the axial direction and that extends in a direction perpendicular to the axial direction.

The wheel gear 36 is configured in such a way that a part (an end portion on a side provided with the guide end plate portion 44, and a part near the end portion) on a door-width-direction vehicle outer side in the guide member 33 can be accommodated in (which can be rephrased as "be loosely inserted into") the wheel gear 36. The wheel gear 36 is configured in such a way as to be rotatable relative to the guide member 33 in a state where the guide member 33 is accommodated in the wheel gear 36.

The gear tube portion 45 includes an outer peripheral surface provided with a worm wheel portion 451 (i.e., a portion where gear teeth are arranged) that can mesh with the worm 352. The worm wheel portion 451 is provided at a position offset toward an opening end portion (an end portion opposite to a side provided with the gear end plate portion 46) of the gear tube portion 45. Specifically, a tooth width dimension of the worm wheel portion 451 is smaller than an axial-direction dimension of the gear tube portion 45. A tooth width center of the worm wheel portion 451 is offset from an axial-direction center of the gear tube portion 45 toward the opening end portion of the gear tube portion 45.

The gear end plate portion 46 is provided with a spindle screw engagement hole 461. The spindle screw engagement hole 461 is a penetration hole that has a non-circular cross section and penetrates in the axial direction (a thickness direction of the gear end plate portion 46), and is configured in such a way that a wheel gear engagement portion 373 of the spindle screw 37 can be inserted into the spindle screw engagement hole 461. In a state where the wheel gear engagement portion 373 of the spindle screw 37 enters the spindle screw engagement hole 461 of the wheel gear 36, the wheel gear 36 and the spindle screw 37 rotate integrally with each other. In the present embodiment, a penetration hole (more specifically, an elongated hole) having a non-circular cross section is applied as the spindle screw engagement hole 461.

The spindle screw 37 is an example of a male screw member in this disclosure, and is a member that moves the nut in the axial direction by being rotated by the rotational power of the actuator 35. The spindle screw 37 is provided with a male screw portion 371, the guide insertion portion 372, the wheel gear engagement portion 373, and the supported shaft portion 374 arranged in this order in the axial direction from one end side. The male screw portion 371 is a part that includes an outer peripheral surface provided with a screw thread, and is configured in such a way as to be able to be screwed into the screw hole 321 of the pressing nut 32.

The guide insertion portion 372 of the spindle screw 37 is a part configured in such a way as to be insertable through (which can be rephrased as "insertable into") the spindle screw insertion hole 441 provided in the guide end plate portion 44 of the guide member 33, and is a part configured in such a way as to have a substantially circular cross section. In a state where the guide insertion portion 372 is inserted through the spindle screw insertion hole 441, the spindle screw 37 is rotatable relative to the guide member 33.

The wheel gear engagement portion 373 of the spindle screw 37 is a part configured in such a way as to be insertable through (which can be rephrased as "insertable into") the spindle screw engagement hole 461 of the gear end plate portion 46 of the wheel gear 36, and is a part having a shape that is substantially the same as or substantially similar to that of the spindle screw engagement hole 461 in a view in the axial direction. In a state where the wheel gear engagement portion 373 is inserted through the spindle screw engagement hole 461, the spindle screw 37 cannot rotate relative to the wheel gear 36, but rotates integrally with the wheel gear 36.

The supported shaft portion 374 of the spindle screw 37 is a part provided at the one end portion of the spindle screw 37 in the axial direction, and is configured in such a way as to be insertable into the spindle screw support portion 402 of the housing 40. Specifically, the supported shaft portion 374 of the spindle screw 37 is a part having a substantially circular cross section. In a state where the supported shaft portion 374 is inserted into the spindle screw support portion 402, the spindle screw 37 is rotatable relative to the housing 40 (i.e., relative to the casing 31).

The circuit board 38 is a board configured in such a way as to electrically connect a control device or the like outside the door pushing device 30 to electrical equipment arranged in the door pushing device 30 and including the actuator 35. The circuit board 38 includes a connector portion for connection to a connector of a harness arranged outside the door pushing device 30, and a predetermined wiring pattern. A configuration of the circuit board 38 is not particularly limited.

Figure 5:
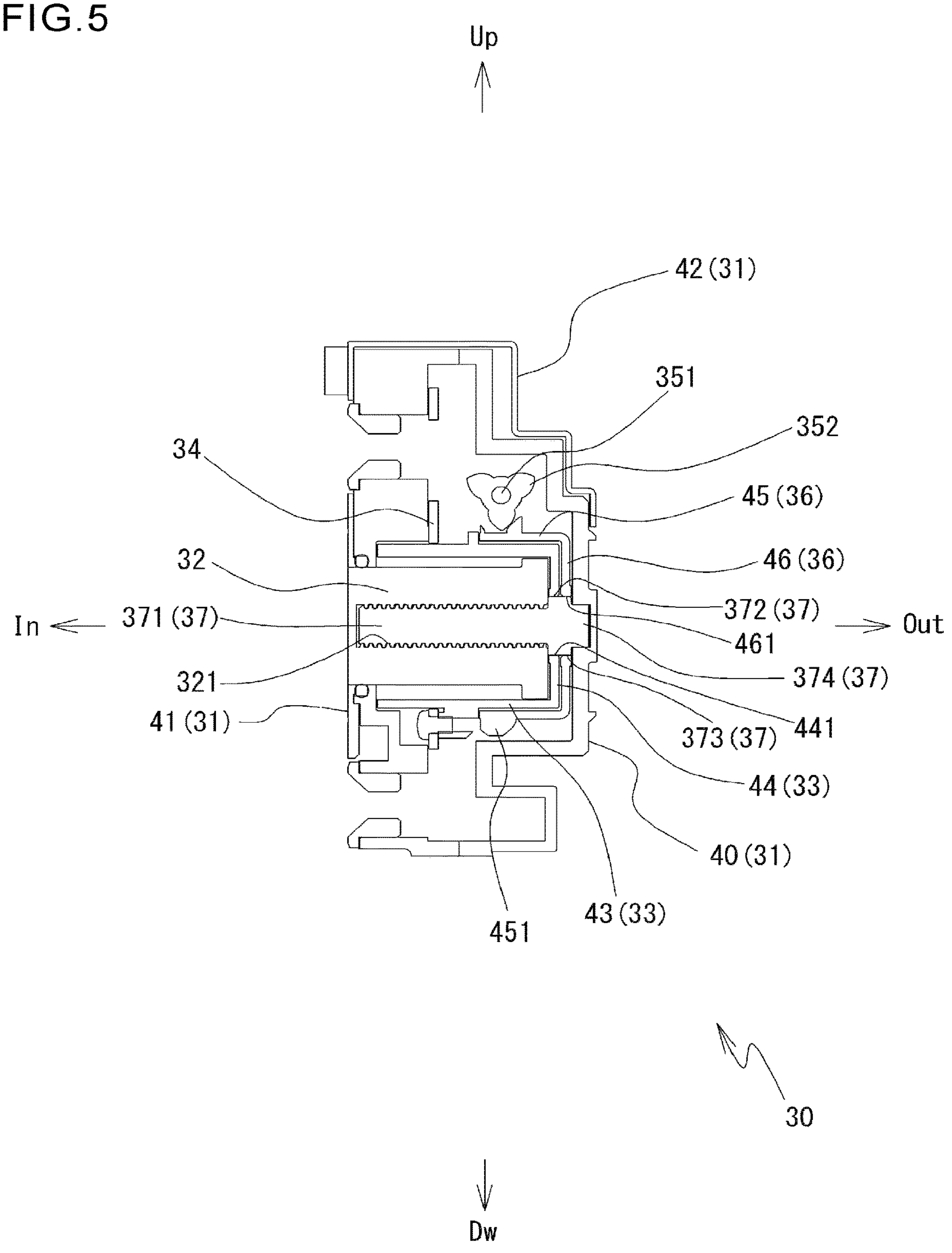
FIG. 5 is a sectional view illustrating the configuration and operation of the vehicle door pushing device.
Figure 6:
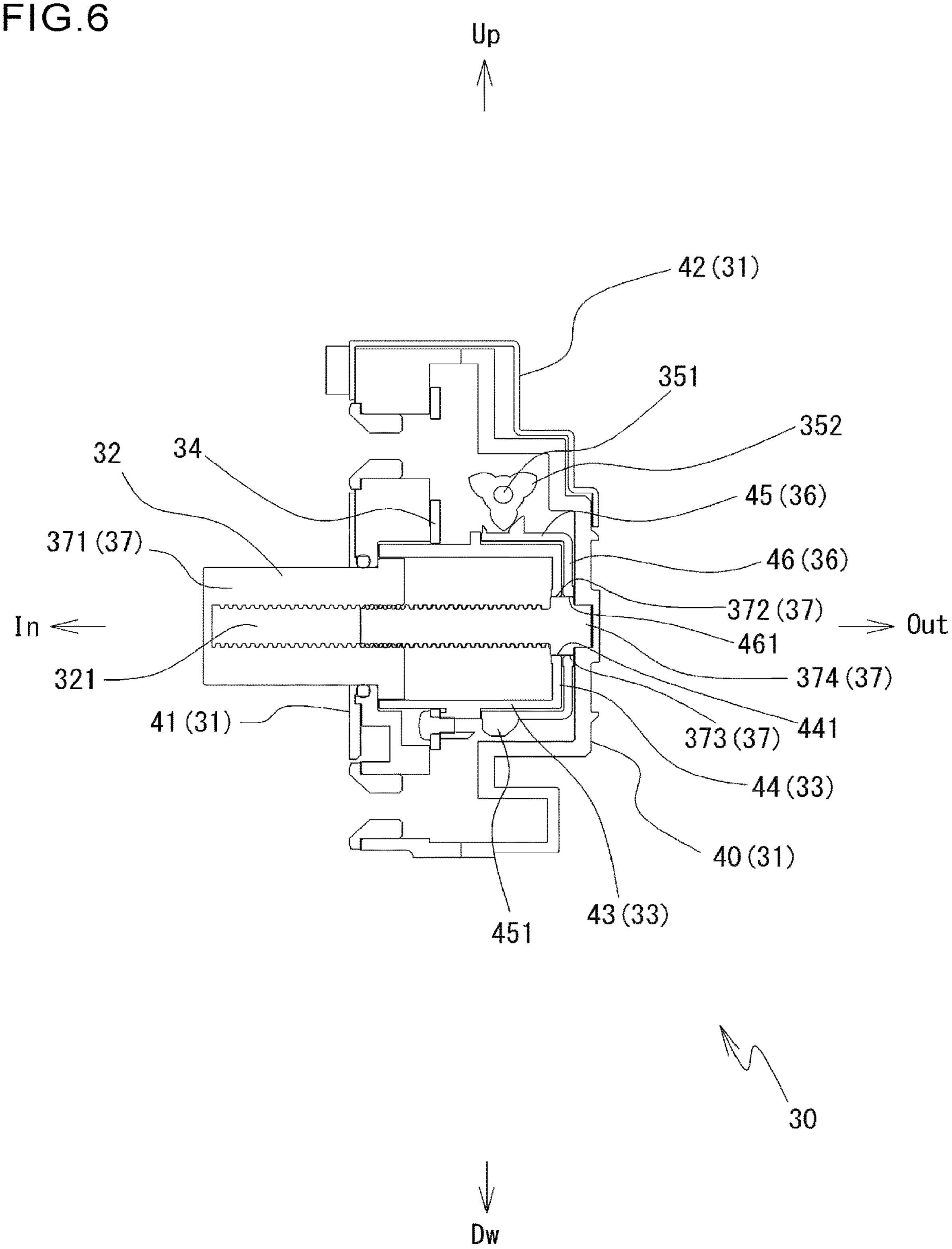
FIG. 6 is a sectional view illustrating the configuration and the operation of the vehicle door pushing device.

Next, an assembly structure of the door pushing device 30 is described. FIG. 5 and FIG. 6 are sectional views illustrating a structure and operation of the door pushing device 30, and are sectional views in the V-V arrows in FIG. 3. The spindle screw 37, the wheel gear 36, the guide member 33, and the pressing nut 32 are arranged in such a way as to be coaxial with each other while the axes thereof are substantially parallel to the door width direction. The actuator 35 is arranged in such a way that the rotational shaft 351 is substantially perpendicular to the door width direction (in the present embodiment, the rotational shaft 351 is substantially parallel to the front-rear direction).

The spindle screw 37 is arranged on a vehicle inner side of the housing 40 in the door width direction in such a way that the supported shaft portion 374 is located on a vehicle outer side in the door width direction, and the male screw portion 371 is located on a vehicle inner side in the door width direction. The supported shaft portion 374 is inserted into the spindle screw support portion 402 of the housing 40. Thereby, the vehicle-outer-side end portion of the spindle screw 37 in the door width direction is supported in such a way as to be rotatable relative to the housing 40.

The wheel gear 36 is arranged on an inner side of the housing 40 in the door width direction while being orientated in such a way that the side provided with the gear end plate portion 46 is located on a vehicle outer side in the door width direction. The wheel gear 36 is accommodated in the wheel gear accommodation portion 401. In this state, a surface included in the gear end plate portion 46 and located on a vehicle outer side in the door width direction is close to and faces a surface included in the wheel gear accommodation portion 401 of the housing 40 and located on a vehicle inner side in the door width direction. At least a part of the surface included in the gear end plate portion 46 and located on a vehicle outer side in the door width direction may contact with the surface included in the wheel gear accommodation portion 401 of the housing 40 and located on a vehicle inner side in the door width direction. In a state where the wheel gear 36 and the spindle screw 37 are arranged in the housing 40, the wheel gear engagement portion 373 of the spindle screw 37 enters the spindle screw engagement hole 461 of the wheel gear 36. Thus, rotation of the wheel gear 36 causes the spindle screw 37 to rotate integrally with the wheel gear 36.

The guide member 33 is arranged while being oriented in such a way that the opening side is located on a vehicle inner side in the door width direction, and a side provided with the spindle screw insertion hole 441 is located on a vehicle outer side in the door width direction. The guide member 33 is fixed to the casing 31 via the frame 34. For example, the guide member 33 is fixed to the frame 34 by screws. The frame 34 to which the guide member 33 is fixed is sandwiched and held by the housing 40 and the cover 41, and is co-fastened to the housing 40 and the cover 41 by screws for fastening the housing 40 and the cover 41 to each other. Thus, the guide member 33 cannot rotate and move in the door width direction, relative to the casing 31.

When the guide member 33 is arranged, a part in the guide member 33 and on a vehicle outer side in the door width direction is accommodated inside the wheel gear 36. In this state, the guide insertion portion 372 of the spindle screw 37 is inserted into the spindle screw insertion hole 441 of the guide member 33, and the male screw portion 371 of the spindle screw 37 protrudes from the guide end plate portion 44 to a vehicle inner side in the door width direction (the male screw portion 371 is located inside the guide tube portion 43). Since each of the guide insertion portion 372 of the spindle screw 37 and the spindle screw insertion hole 441 of the guide member 33 has a substantially circular cross section, the spindle screw 37 can rotate relative to the casing 31 without interference with the guide member 33. In a state where the guide member 33 is arranged, a surface in the guide end plate portion 44 and on a vehicle outer side in the door width direction is close to and faces a surface in the gear end plate portion 46 of the wheel gear 36 and on a vehicle inner side in the door width direction. At least a part of the surface in the guide end plate portion 44 and on a vehicle outer side in the door width direction may contact with the surface in the gear end plate portion 46 of the wheel gear 36 and on a vehicle inner side in the door width direction.

The pressing nut 32 is arranged while being oriented in such a way that the opening side (the side where the screw hole 321 is exposed) is located on a vehicle outer side in the door width direction. At least a part of the pressing nut 32 is accommodated inside the guide member 33. Further, a part in the guide member 33 and on a vehicle outer side in the door width direction is accommodated inside the wheel gear 36, and thus, the pressing nut 32 includes a part that overlaps with the wheel gear 36 and the guide member 33, with respect to the door width direction. In other words, with respect to the door width direction, the pressing nut 32 includes a part located between a vehicle-outer-side end and a vehicle-inner-side end of the wheel gear 36 in the door width direction, and a part located between a vehicle-outer-side end and a vehicle-inner-side end of the guide member 33 in the door width direction.

The pressing nut 32 is arranged in such a way that the male screw portion 371 of the spindle screw 37 is screwed into the screw hole 321 and the guide protrusion portion 322 engages with a guide groove portion 431 provided in the guide member 33. With such a configuration, the guide member 33 allows the pressing nut 32 to move in a direction substantially parallel to the door width direction, but restricts the pressing nut 32 from rotating relative to the casing 31 around the axis. Thus, rotation of the spindle screw 37 relative to the casing 31 causes the pressing nut 32 to be linearly moved relative to the casing 31 to a vehicle outer side or a vehicle inner side in the door width direction, depending on a rotational direction of the spindle screw 37, without rotation of the pressing nut 32 relative to the casing 31.

The actuator 35 is arranged in such a way that the rotational shaft 351 is oriented perpendicularly to the door width direction and the worm 352 meshes with the worm wheel portion 451 of the wheel gear 36. The actuator 35 is accommodated in (fitted into) the actuator accommodation portion 403 provided in the housing 40. In the present embodiment, the actuator 35 is arranged in such a way that the worm 352 is located on an upper side of the wheel gear 36 and the rotational shaft 351 is oriented substantially parallel to the front-rear direction.

The cover 41 is attached on a vehicle inner side in the housing 40 in the door width direction. In a state where the cover 41 is attached to the housing 40, the waterproof cover 42 is attached in such a way as to cover upper portions of the housing 40 and the cover 41. In a state where the cover 41 and the waterproof cover 42 are attached, the pressing nut insertion holes 411 and 421 of the cover 41 and the waterproof cover 42 are located coaxially with the pressing nut 32, and communicate with each other substantially coaxially with each other. A vehicle-inner-side end surface of the pressing nut 32 in the door width direction is exposed through the pressing nut insertion holes 411 and 421 of the cover 41 and the waterproof cover 42.

As described above, the worm wheel portion 451 of the wheel gear 36 is provided at a position offset from the axial-direction center of the gear tube portion 45 to a vehicle inner side in the door width direction. The rotational shaft 351 of the actuator 35 is located at a position (more specifically, a position offset from the axial-direction center of the wheel gear 36 to a vehicle inner side in the door width direction) offset to a vehicle inner side in the door width direction from a vehicle-outer-side surface of the gear end plate portion 46 of the wheel gear 36 in the door width direction. Thus, as illustrated in FIG. 5 and FIG. 6, a vehicle-outer-side end of a body of the actuator 35 in the door width direction can be located on a door-width-direction vehicle inner side of the vehicle-outer-side surface of the gear end plate portion 46 of the wheel gear 36 in the door width direction. In the present embodiment, the body of the actuator 35 is a body of the electric motor. The body of the electric motor is a part in which a stator and a rotor are provided, and is a part that can be rephrased as "a case of the motor". A vehicle-inner-side end of the body of the actuator 35 in the door width direction is located on a door-width-direction vehicle outer side of a vehicle-inner-side end of the guide member 33 in the door width direction. In other words, with respect to the door width direction, the actuator 35 is arranged in such a way as to be accommodated between the vehicle-outer-side surface of the gear end plate portion 46 of the wheel gear 36 in the door width direction and the vehicle-inner-side surface of the guide member 33 in the door width direction.

Next, operation of the door pushing device 30 is described. When the actuator 35 is operated, rotation of the rotational shaft 351 of the actuator 35 is transmitted to the spindle screw 37 via the worm 352 and the wheel gear 36. The pressing nut 32 is screwed onto the male screw portion 371 of the spindle screw 37, and is guided by the guide member 33 in such a way as to be linearly movable in the axial direction while being prevented from rotating. Thus, the rotation of the spindle screw 37 causes the pressing nut 32 to be linearly moved in the axial direction.

The pressing nut 32 is configured in such a way as to be movable between a first position (refer to FIG. 5) and a second position (refer to FIG. 6) by moving in the door width direction relative to the casing 31. The first position is a position at a door-width-direction vehicle-outer-side end of the movable range, and is a position where the entire pressing nut 32 is accommodated in the casing 31. The second position is a position at a door-width-direction vehicle-inner-side end of the movable range, and is a position where a part (a part on a vehicle inner side in the door width direction) of the pressing nut 32 protrudes from the pressing nut insertion holes 411 and 421 of the casing 31 to a vehicle inner side in the door width direction.

While the vehicle door 11 is in the closed state (in other words, while the door pushing device 30 is not operated), the pressing nut 32 is held at the first position illustrated in FIG. 5. Then, when the door lock device is switched to the unlatching state and it is determined that the vehicle door 11 cannot be opened due to freezing or the like, the door pushing device 30 is operated. When the door pushing device 30 is operated, rotational power of the actuator 35 causes a vehicle-inner-side part of the pressing nut 32 in the door width direction to be protruded from the pressing nut insertion holes 411 and 421 of the casing 31, and thereby, the pressing nut 32 is moved from the first position toward the second position. At this time, the pressing nut 32 comes into contact with a predetermined part (e.g., a vehicle-outer-side surface of a pillar in the vehicle width direction) of the vehicle body 10 and presses the vehicle body 10, and thus, the reaction force causes the vehicle door 11 to be moved slightly (specifically, by a distance depending on a movement amount of the pressing nut 32) from the closing position toward the opening position. Thereby, even when the vehicle door 11 is frozen, the vehicle door 11 can be opened. Then, drive force of the actuator 35 causes the pressing nut 32 to return from the second position to the first position.

According to the present embodiment, the wheel gear 36 has the cup-shaped structure that accommodates, inside, a part included in the pressing nut 32 and located on a vehicle outer side in the door width direction. According to such a configuration, the wheel gear 36 and the pressing nut 32 include mutually overlapping parts (parts that overlap with each other in a view in a direction perpendicular to the door width direction) with respect to the door width direction. More specifically, with respect to the door width direction, at least a part of the pressing nut 32 is located between the vehicle-outer-side end and the vehicle-inner-side end of the wheel gear 36 in the door width direction. Thus, a dimension of the door pushing device 30 in the door width direction can be made smaller than that of a configuration in which the wheel gear 36 and the pressing nut 32 do not include mutually overlapping parts with respect to the door width direction.

In other words, when the wheel gear 36 is a simple disk-shaped member, the wheel gear 36 and the pressing nut 32 are arranged in the door width direction and do not overlap with each other with respect to the door width direction, and thus, a door-width-direction dimension of the door pushing device 30 is larger than the sum of a door-width-direction dimension of the pressing nut 32 and a door-width-direction dimension of the wheel gear 36. In contrast to this, according to the present embodiment, the wheel gear 36 and the pressing nut 32 include the mutually overlapping parts with respect to the door width direction, and thus, a door-width-direction dimension can be made smaller than that of a configuration that does not include the mutually overlapping parts.

The worm wheel portion 451 is provided at a position offset toward the end portion (i.e., a vehicle-inner-side end in the door width direction) on an opening side in the wheel gear 36, and the worm wheel portion 451 meshes with the worm 352 provided on the rotational shaft 351 of the electric motor that is the actuator 35. Thus, the rotational shaft 351 of the actuator 35 extends in a direction perpendicular to the door width direction, and is located near the door-width-direction vehicle inner side end of the wheel gear 36, with respect to the door width direction. According to such a configuration, the worm 352 can be arranged on a vehicle inner side in the door width direction (substantially at the door-width-direction center of the casing 31), as compared with a configuration in which teeth are provided at a vehicle-outer-side end portion in the wheel gear 36 in the door width direction (or a configuration in which the wheel gear 36 has a substantially disk-shaped structure, and is provided adjacent to and on a vehicle outer side of the pressing nut 32 in the door width direction). Thus, the worm 352 can be prevented from protruding to a vehicle outer side from the door-width-direction vehicle-outer-side surface of the gear end plate portion 46 of the wheel gear 36 (or a dimension of a part that protrudes to a vehicle outer side can be reduced). Accordingly, a door-width-direction dimension of the door pushing device 30 can be reduced.

In the present embodiment, with respect to the door width direction, the body of the actuator 35 is located between the door-width-direction vehicle-outer-side end of the wheel gear 36 and the door-width-direction vehicle-inner-side end of the guide member 33. In other words, with respect to the door width direction, the body of the actuator 35 does not protrude beyond the door-width-direction vehicle-outer-side end of the wheel gear 36 to a vehicle outer side in the door width direction, and does not protrude beyond the door-width-direction vehicle-inner-side end of the guide member 33 to a vehicle inner side in the door width direction. According to such a configuration, the actuator accommodation portion 403 provided in the housing 40 can be provided on a vehicle inner side of the wheel gear accommodation portion 401 in the door width direction (in other words, the actuator accommodation portion 403 does not need to protrude beyond the wheel gear accommodation portion 401 to a vehicle outer side in the door width direction, and for this reason, a door-width-direction dimension of the door pushing device 30 can be reduced.

In the present embodiment, the guide member 33 has a cup-shaped structure, and is configured in such a way as to be able to accommodate the distal end portion (a part) of the pressing nut 32 inside. Further, the wheel gear 36 also has the cup-shaped structure, and the guide member 33 is accommodated inside the wheel gear 36. According to such a configuration, while the door pushing device 30 is not operated, at least a part in the pressing nut 32 and on a vehicle outer side in the door width direction is accommodated in an inner space of the wheel gear 36. In other words, with respect to the door width direction, the pressing nut 32 and the wheel gear 36 include mutually overlapping parts. Thus, a door-width-direction dimension of the door pushing device 30 can be made smaller than that of a configuration in which the pressing nut 32 and the wheel gear 36 do not include mutually overlapping parts with respect to the door width direction.

Since a door-width-direction dimension of the door pushing device 30 can be reduced, the door pushing device 30 can be easily arranged at an upper portion of the door body portion 12. As described above, in the vehicle door 11 that includes the door lock device 18 and the door closer device 19 driving the door lock device 18, the door lock device 18 is arranged near a rear end portion of the door body portion 12, and the door closer device 19 is arranged on a lower side of the door lock device 18, near the rear end portion of the door body portion 12, and near the lower end portion of the door body portion 12. According to such a configuration, near the lower end portion of the door body portion 12, it is difficult to secure a space for arranging the door pushing device 30, and thus, the door pushing device 30 needs to be arranged near the rear end portion and the upper end portion of the door body portion 12 of the vehicle door 11. However, the window glass 17 is accommodated in a part near the upper end portion of the door body portion 12, and thus, the door pushing device 30 needs to be arranged at a position shifted from the movement trajectory of the window glass 17 in such a way as not to interfere with the window glass 17. Specifically, the door pushing device 30 needs to be arranged between the window glass 17 (the movement trajectory of the window glass 17) and the inner panel 15. Thus, a door-width-direction dimension of the door pushing device 30 needs to be reduced.

In the present embodiment, a door-width-direction dimension of the door pushing device 30 can be reduced as described above, and thus, the door pushing device 30 can be arranged at the upper portion (more specifically, a position that overlaps with the window glass 17, in a view in the door width direction, accommodated in the door body portion 12) of the door body portion 12 of the vehicle door 11.

Although the embodiment of this disclosure is described above, this disclosure is not limited to the above-described embodiment. This disclosure can be modified within a range that does not deviate from the essence, and these modifications are also included within the technical scope of this disclosure.

For example, the above-described embodiment represents the configuration in which the pressing nut 32 includes the guide protrusion portion 322, and the guide member 33 includes the guide groove portion 431, but there is no limitation to such a configuration. For example, a guide groove portion that extends in the axial direction may be provided on an outer peripheral surface (side surface) of the pressing nut 32, and a guide protrusion portion may be provided on an inner peripheral surface of the tube portion of the guide member 33.

The above-described embodiment represents the configuration in which the worm 352 is attached to the rotational shaft 351 of the electric motor, and the wheel gear 36 meshes with the worm 352, but there is no limitation to such a configuration. For example, another gear or gear train configured in such a way as to transmit the rotational power of the electric motor to the wheel gear 36 may be provided between the electric motor and the wheel gear 36.

A vehicle door pushing device according to an aspect of this disclosure is arranged in a vehicle door that can be opened and closed with respect to a vehicle body. The vehicle door pushing device includes a gear member, a male screw member, and a female screw member. The gear member is rotatable, by rotational power being output by an actuator, around an axis extending in a first direction substantially parallel to a vehicle width direction in a state where the vehicle door is in a closed state. The male screw member is arranged coaxially with the gear member, and rotates integrally with the gear member. The female screw member is screwed onto the male screw member. The female screw member is movable, along the first direction by rotation of the male screw member, to each of a first position of being accommodated in a casing and a second position of being located on a vehicle inner side of the first position and at least partially protruding from the casing to the vehicle inner side. The gear member has a cup-shaped structure being open at an end on the vehicle inner side in the first direction in such a way as to be able to accommodate at least a part of the female screw member.

The "first direction" can be rephrased as a width direction of the vehicle door or a thickness direction of the vehicle door.

According to the aspect of this disclosure, in the first direction (i.e., the door width direction) being "the vehicle width direction of the vehicle door in a state where the vehicle door is in the closed state", the gear member and the female screw member can include mutually overlapping parts (can include parts that overlap with each other in a view in a direction perpendicular to the first direction). Thus, a dimension of the door pushing device in the first direction can be made smaller than that of a configuration in which the gear member and the female screw member do not include mutually overlapping parts in the first direction. In other words, when the gear member is a conventional disk-shaped gear, the gear member and the female screw member are arranged in the first direction and do not overlap with each other with respect to the first direction. Thus, in the conventional configuration, a dimension of the door pushing device in the first direction is larger than a sum of a dimension of the gear member in the first direction and a dimension of the female screw member in the first direction. In contrast, in this embodiment, the gear member and the female screw member can include the mutually overlapping parts in the first direction, and thus, a dimension (a dimension in the door width direction) of the vehicle door pushing device in the first direction can be made smaller than that of the configuration that does not include the mutually overlapping parts.

The gear member may include a cylindrical part that can accommodate at least a part of the female screw member inside. The cylindrical part may include an outer peripheral surface provided with teeth that receive rotational power of the actuator of the gear member.

The gear member may include a worm wheel portion provided with teeth that mesh with a worm rotated by rotational power of the actuator around an axis substantially perpendicular to the first direction. The worm wheel portion may be provided at a position offset to the vehicle inner side from a center of the gear member in the first direction.

According to such a configuration, the worm can be arranged at a position offset to the vehicle inner side of the vehicle outer end of the gear member in the first direction. Thus, a dimension of the vehicle door pushing device in the first direction can be made smaller than that of a configuration in which the worm includes a part located on the vehicle outer side of the vehicle outer end of the gear member in the first direction.

The actuator may be an electric motor. The worm may be attached to a rotational shaft of the electric motor.

According to such a configuration, the rotational shaft of the electric motor being the actuator extends in a direction substantially perpendicular to the first direction, and is located, with respect to the first direction, on the vehicle inner side of the vehicle-outer-side end of the gear member in the first-direction. Thus, according to such a configuration, a body of the electric motor can be prevented from protruding to a vehicle outer side from the vehicle-outer-side end of the gear member in the first direction, or a protrusion dimension can be reduced. Accordingly, a dimension of the vehicle door pushing device in the first direction can be reduced.

The electric motor may include a body located on the vehicle inner side of an end that is included in the male screw member and that is located on a vehicle outer side.

According to such a configuration, the body of the electric motor does not protrude to the vehicle outer side from the vehicle-outer-side end of the gear member in the first direction, and thus, a dimension of the vehicle door pushing device in the first direction can be reduced.

The vehicle door pushing device may include a guide member that guides the female screw member in such a way as to allow linear movement of the female screw member in the first direction relative to the casing, but restrict rotation of the female screw member relative to the casing. The guide member may have a cup-shaped structure including an inner space that is open at an end on the vehicle inner side in the first direction and that is able to accommodate the female screw member. The guide member may be configured in such a way as to be at least partially accommodated in the gear member.

In this case, the first position of the female screw member may be a position where an end portion in the female screw member and on the vehicle outer side is located on the vehicle outer side of the end that is included in the gear member and that is located on the vehicle inner side.

According to such a configuration, the gear member and the female screw member can include mutually overlapping parts in the first direction, in a state where the guide member is accommodated in the gear member and the female screw member is accommodated in the guide member. Thus, a dimension of the door pushing device in the first direction can be made smaller than that of a configuration in which the gear member and the female screw member do not have the mutually overlapping parts in the first direction.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle door pushing device being arranged in a vehicle door that can be opened and closed with respect to a vehicle body, the vehicle door pushing device comprising:

a gear member that is rotatable, by rotational power being output from an actuator, around an axis extending in a first direction substantially parallel to a vehicle width direction in a state where the vehicle door is in a closed state;

a male screw member that is arranged coaxially with the gear member, and rotates integrally with the gear member; and a female screw member that is screwed onto the male screw member, and is movable, along the first direction by rotation of the male screw member, to each of a first position of being accommodated in a casing and a second position at least partially protruding from the casing towards a vehicle inner side, wherein the gear member is open at an end on the vehicle inner side in the first direction in such a way as to be able to accommodate at least a part of the female screw member, the gear member includes a cylindrical part that can accommodate at least a part of the female screw member, and the cylindrical part includes an outer peripheral surface provided with teeth that receive rotational power of the actuator of the gear member.

2. The vehicle door pushing device according to claim 1, wherein the gear member includes a worm wheel portion provided with the teeth that mesh with a worm being rotated by rotational power of the actuator around an axis substantially perpendicular to the first direction, and the worm wheel portion is provided at a position offset to the vehicle inner side from a center of the gear member in the first direction.

3. The vehicle door pushing device according to claim 2, wherein the actuator is an electric motor, and the worm is attached to a rotational shaft of the electric motor.

4. The vehicle door pushing device according to claim 3, wherein the electric motor includes a body that is included in the male screw member.

5. The vehicle door pushing device according to claim 1, further comprising a guide member that guides the female screw member in such a way as to allow linear movement of the female screw member in the first direction relative to the casing, but restrict rotation of the female screw member relative to the casing, wherein the guide member includes an inner space that is open on the vehicle inner side in the first direction and is able to accommodate the female screw member, and the guide member is configured in such a way as to be at least partially accommodated in the gear member.

* * * * *